US011967494B2

(12) United States Patent
Hadjar et al.

(10) Patent No.: US 11,967,494 B2
(45) Date of Patent: Apr. 23, 2024

(54) INTEGRATED NATIVE OXIDE DEVICE BASED ON ALUMINUM, ALUMINUM ALLOYS OR BERYLLIUM COPPER (INOD) AND DISCRETE DYNODE ELECTRON MULTIPLIER (DDEM)

(71) Applicant: SKYFINIS, INC., Pineville, NC (US)

(72) Inventors: Omar Hadjar, Rochester, NY (US); Joseph K. Hosea, Amherst, MA (US)

(73) Assignee: SKYFINIS, INC., Charlotte, NC (US)

( * ) Notice: Subject to any disclaimer, the term of this patent is extended or adjusted under 35 U.S.C. 154(b) by 447 days.

(21) Appl. No.: 17/262,346

(22) PCT Filed: Jul. 18, 2019

(86) PCT No.: PCT/US2019/042438

§ 371 (c)(1),
(2) Date: Jan. 22, 2021

(87) PCT Pub. No.: WO2020/033119

PCT Pub. Date: Feb. 13, 2020

(65) Prior Publication Data

US 2021/0358730 A1 Nov. 18, 2021

Related U.S. Application Data

(60) Provisional application No. 62/716,185, filed on Aug. 8, 2018.

(51) Int. Cl.
*H01J 43/20* (2006.01)
*H01J 9/12* (2006.01)

(52) U.S. Cl.
CPC .............. *H01J 43/20* (2013.01); *H01J 9/125* (2013.01)

(58) Field of Classification Search
CPC .................................. H01J 9/125; H01J 43/20
(Continued)

(56) References Cited

U.S. PATENT DOCUMENTS 4,143,291 A 3/1979 Morales
4,668,890 A 5/1987 Swingler
(Continued)

OTHER PUBLICATIONS

International Search Report for PCT/US2019/042438, dated Oct. 31, 2019, 3 pages.
(Continued)

*Primary Examiner* — Christopher M Raabe
(74) *Attorney, Agent, or Firm* — Cozen O'Connor

(57) ABSTRACT

Techniques produce integrated native metal oxide discrete elements which can be used to fabricate discrete dynode electron multiplier (DDEM) devices, for example by creating dynodes with a native oxide as secondary electron emissive (SEE) layer from a metal block. The metal block may comprise or consist of a metal base component, for example Al, Al alloys or BeCu, of metal oxide SEE materials Al2O3 or BeO. Growing a native oxide from these base metals, Al2O3 or BeO eliminates the need of a costly and time-consuming SEE coating on the dynode surface. Furthermore, aluminum alloys offer intrinsic dopant, in particular magnesium where its oxide provides a higher secondary electron yield than the aluminum oxide. The use of aluminum, its alloys or BeCu material block allows flexibility in design and fabrication of DDEM without an SEE coating process.

15 Claims, 9 Drawing Sheets

(58) Field of Classification Search
USPC ...................................................... 313/103 R
See application file for complete search history.

(56) References Cited

U.S. PATENT DOCUMENTS

| | | | | |
|---|---|---|---|---|
| 5,680,008 | A | 10/1997 | Brandes et al. | |
| 2013/0240907 | A1 | 9/2013 | Jackman et al. | |
| 2015/0187550 | A1 | 7/2015 | Hirano | |
| 2015/0235825 | A1 | 8/2015 | Nagata et al. | |
| 2017/0352515 | A1 | 12/2017 | Hosea et al. | |
| 2019/0164734 | A1* | 5/2019 | Kobayashi .............. | H01J 9/125 |

OTHER PUBLICATIONS

Written Opinion for PCT/US2019/042438, dated Oct. 31, 2019, 8 pages.
Examination Report No. 1 dated Oct. 8, 2021 in corresponding Australian Application No. 2019317273, 5 pages.

* cited by examiner

INTEGRATED NATIVE OXIDE DEVICE BASED ON ALUMINUM, ALUMINUM ALLOYS OR BERYLLIUM COPPER (INOD) AND DISCRETE DYNODE ELECTRON MULTIPLIER (DDEM)

TECHNICAL FIELD

This disclosure is generally related to device fabrication, and in particular fabrication of integrated native metal oxide discrete elements, which can advantageously be used to fabricate a discrete dynode electron multiplier (DDEM) by creating dynodes with a native oxide as secondary electron emissive (SEE) layer for use in electron multiplication process. The dynodes are machined from a metal block that comprises: a metal base component, namely Al, Al alloys or BeCu, and metal oxide SEE materials, namely Al2O3 or BeO, advantageously eliminating the need of a costly and time-consuming processing of applying an SEE coating on the dynode surface, and for aluminum alloys advantageously offering an intrinsic &pant to provide a higher secondary electron yield than the aluminum oxide.

BACKGROUND

An electron multiplier is a device based on avalanche effect through electron multiplication, made possible by use of high secondary electron emissivity materials such as Al2O3, BeO, SiO2 and MgO.

The electrons are multiplied after impacting the surface. This effect produces more secondary electrons and the process repeats itself after multiple surfaces creating the avalanche effect, the basis of electron multiplier devices.

This avalanche through multiple surface interactions is sustained by properly designed electric field between consecutive surfaces. The electric field provides favorable electron collisional energy to generate secondary electrons (SEE) and efficient electron trajectories (ion optics) to another target surface.

The process is repeated as necessary to achieve a certain total number of electrons. This principle is valid for both continuous and discrete dynode electron multiplier. In the case of DDEM, electron trajectories ion optics are determined by the electric field defined by the shape or geometry and position of the individual dynode in a dynode array. Detail operation has been widely described in the literature, and some constructions have been disclosed.

The basic application of electron multiplier is to detect high energetic neutral particles, charged particles, high energy photons or photons in general with certain use of photocathode at the device input.

Both types, continuous and discrete dynode electron multiplier, are available commercially with their own unique fabrication methods. Further attention will be given to the construction of discrete dynode electron multiplier.

FIG. 1A shows a conventional discrete dynode electron multiplier (DDEM) where individual dynodes are made of metal sheet such as stainless steel or BeCu formed specifically to create ion optic feature and SEE surfaces. In the case of stainless steel, a SEE material such as Al2O3, MgO, or SiO2. or metal coating such as Al must be deposited onto the surface of the dynodes. However, there is a limitation on the activation temperature of SEE material since breakage or damage of the coating may occur due to material dissimilarity between the dynode and the coating. The SEE BeO of BeCu material sheet can be activated directly by a heating process. Upper 100*b* and lower 100*a* dynode array are constructed by individual dynodes such as 11 and 12. They are assembled manually on an electrically insulated structure, such as ceramics by using fixtures. Individual dynode shape can be different, depending on the design intent, however this prior technology is limited in the design due to inherent limitations of the dynode metal sheet forming technology employed in the conventional process. Each dynode is successively connected to a resistor in a network 13. In practice, diodes, capacitors and active electrical components such as transistor are used in the network. Ceramic or standard printed circuit board (PCB) may be used to house the electrical network 13. Input end 14 accepts the incident particles to be detected, and output end or anode or electron collector 15 collects the resulting electrons generated by multiplication process from dynode-to-dynode.

As illustrated in FIG. 1B, the detection process starts when a single particle 16 strikes an emissive surface area of a dynode 11, at the input side 14, produces secondary electrons 17. After collisions with several surfaces, the multiplied electrons are collected into an anode 15 as an electrical pulse 18, which is fed to further signal processing stages.

The above described sheet based manufacturing process has been used to manufacture DDEM for the commercial market. Clearly, this approach does not offer cost effectiveness in manufacturing in terms of labor, quality, substantial number of inventories, error in assembling by operators, assembling high precision tooling/fixtures, etc. Furthermore, applying an SEE coating on the surface of the metal sheet dynode significantly increases the cost. It is worth noting that sheet based manufacturing process places substantial limitations the ability to precisely shape the dynodes and on the precision of dynode location due to restrictions inherent in metal sheet forming technique and restrictions inherent in mounting techniques, respectively.

SUMMARY

Disclosed herein is an integrated native oxide device-based technology which allows the fabrication of an electron multiplier suitable for low cost manufacturing while maintaining high device performance desired by the users. This “coating-less” technology allows for endless flexibility in design, fabrication, and mounting.

There are few secondary electron emissive materials, Al2O3, BeO, SiO2, and MgO that are stable in air and suitable for electron multiplier use. To avoid the need for a costly emissive layer coating, dynode metal base is advantageously selected to be the same as the metal oxide component, the metal oxide which advantageously serves as an electron emissive layer. Aluminum, alloys of aluminum, and BeCu are therefore suitable materials for the dynode raw material since for each of these materials a native emissive layer can be grown simply by oxidation through a heating process (e.g. dry heating; wet heating with steam) in the presence of oxygen (e.g., oxygen, air). Furthermore, aluminum alloys offer intrinsic dopant, particularly magnesium, which in oxide form possess higher secondary electron emission yields than aluminum oxide. The choice of the dopant concentration depends on the particular aluminum alloys series, which varies from a fraction of a percent to several percent (6%).

Endless flexibility in design and fabrication of an DDEM is achieved by building the dynodes by machining from a block of raw material (e.g., aluminum, aluminum alloys, or BeCu). This process allows production of dynodes of a virtually unlimited number of geometries or shapes as suitable for various different applications. For instance, dynodes can be designed and machined to achieve any one or more of: a miniaturization of the device, a wider shape of the dynode(s) to accept ion ribbon profile, a large surface area of the dynode(s) for high ion detection efficiency, a high dynamic range and lifetime, or simply for low cost applications.

A dynode array can be completely formed from a single block of raw material in two separate arrays or a single unified twin array.

Some implementations can decouple the native grown SEE region and the ion optics region within the dynode. The native grown SEE part can be part of a cartridge which would mount into an ion optics structure. Single or double cartridge configurations are possible by design, to form a pair of emissive electron array across from each other.

Some implementations can assemble individual full dynodes into a structure to form a DDEM as is the case for conventional DDEMs. However, in this implementation, the fabrication advantageously does not require an SEE coating on the dynode surfaces since an SEE layer is naturally grown from the material block by a heating process under oxygen or air or by other methods.

Gain enhancement dopants, such as cesium, can be added to the robust native SEE surface. Though, in the presence of an emissive layer coating, precaution must be given to the doping process, in order to avoid coating damage, which in turn would lower the device manufacturing yield. Several fabrication examples based on this principle are described here.

For a high performance DEM fabrication, a dynode array can be formed by bonding aluminum, aluminum alloys, or BeCu block into ceramics or a ceramic with metallic layer, for instance Direct Bonded Copper (DBC), Direct Bonded Aluminum (DBA) or glass materials. Various bonding processes such as brazing, soldering, and fusion (for glass materials) may be suitable, however a process modification introduced to accommodate the differences in coefficient of thermal expansion (CTE) of the metal and the ceramics or glass. Varieties of glass materials snatching specific metal CTEs are available and commonly used in hermetic sealing applications. The metal block (e.g., aluminum, aluminum alloys or BeCu) then is machined to form dynode shape, positioned and separated to become individual functional dynodes in an array structure. Electrical discharge machine (EDM) is a suitable stress-free cutting technique to achieve high precision shape and positioning of the individual dynodes in the array structure, and which translates to best electron transmission of the DDEM and hence higher device performance. The separation process is designed such that electrical insulation is created between individual dynodes for electrical biasing as required to operate an electron multiplier device.

Alternatively, spot welding (e.g., by means of laser or resistive techniques) can be employed to bond DBC or DBA to the metallic block of aluminum, alloys of aluminum, or BeCu. Note that DBC and DBA represent a configuration of a standard thin metal-ceramic-thin metal. Furthermore, the thin metal material may be selected based on its suitability for the spot welding process with an aluminum block, alloys of aluminum block, or BeCu block.

After dynode array formation, the activation process produces native metal oxide SEE layer based on the raw aluminum, aluminum alloys or BeCu. Standard oxidation with all various enhancement such as doping could be applied.

A DDEM can be built from a pair of dynode arrays facing each other and at least one electric network (passive and/or active electrical network) that provides an electrical bias on individual dynode. The electrical network may be carried by or incorporated in at least one side wall.

Due to this "coating-less" approach, entire dynodes can be machined from a single block with a single side bonding to, for example, a ceramic, DBC, or DBA. This produces inherent alignment of all DDEM elements (input dynode, multiple dynodes, anode). A single side wall containing any electric network (e.g., passive and/or active networks) to provide electrical bias on individual dynode may be provided to produce the electron multiplier. Advantageously, no special alignment is needed for the electric network side wall.

Another construction of a DDEM can be executed by, fundamentally, separating the dynode emissive surface features from the dynode ion optic features to form a single/double cartridge which mounts onto the ion optics structure. The aluminum, aluminum alloys, or BeCu block bonded to ceramics, DBC, DBA, or glass, as mentioned above, can be used to build the dynode emissive parts. In this implementation, the metallic blocks are simpler features providing the function of a native secondary electron emitter or simply called a "cartridge". The ion optic function is then integrated into side wall structure to finally form the ion optic structure. A single wall or two walls can be designed to hold the ion optics structure. One of the walls carries or contains an electric network which form part of the DDEM device. This construction can employ a united pair of emissive plates or a separated pair of emissive plates. Such can be advantageously designed as replacement part, being the only part that needs to be replaced to extend the life time of the DDEM beyond its nominal life time, obviating the need for replacement of the whole device. Therefore, it offers cost incentive to end users for consumable replacement of the DDEM.

Another fabrication method is simply machining individually the full dynodes (with the ion optic geometry) from a block of aluminum, block of aluminum alloys or block BeCu. The machining is followed by an activation process to grow a native metallic oxide as an SEE layer prior to assembly of the final designated structure of the DDEM. The designated structure is designed to accommodate easy and precise assembly of the individual dynodes, eliminating operator error in the process, as desired by manufacturers. The principal of individually assembling dynodes can be expanded to thin aluminum and thin aluminum alloys sheets, formed to specific geometries due to the fact that there is no SEE layer coating operation required. Some aluminum alloys, for example 2000 and 6000 series aluminum allows, can be heat treated to stiffen the dynode structures when forming technique, instead of machining, is preferred in the dynode shaping. Therefore, this technique can replace stainless steel dynode constructions where depositing an SEE coating is required. Individual aluminum dynodes can be assembled into printed circuit board (PCB) that are commonly available for electronic circuits, such as standard PCB FR4, DBC, DBA, and laminated ceramic PCBs. Bonding can be performed by soldering or brazing techniques suitable for use with aluminum.

A width of dynodes with a planar symmetry can be extended for applications that detect ions with a wide or ribbon profile. This form is achieved easily by machining a block of aluminum, aluminum alloys, or BeCu to form a dynode, in contrast to forming such from a thin metal sheet.

With this technique, it is possible to manufacture cylindrical dynode array design, for instance, manufacturing of a coaxial electron multiplier (COAXEM). Some of the potential advantages include:

1. COAXEM increases the emissive surface allowing for larger dynamic range while maintaining compact shape and form:
2. COAXEM increases the transmission due to the elimination of the side walls which exist in the planar designs:
3. COAXEM eliminates the alignment restriction as the is mounted on the same axis as the ejected ions:
4. COAXEM can be used with no High energy dynode with a leading outer ring dynode; and
5. COAXEM Allows the integration of the high energy dynode with no added cumbersome structure with a leading inner ring dynode.

Another method to fabricate DDEM is simply machining metal material to include Interconnect Metallic Material (IMM) between dynodes. The BIM can be aluminum, aluminum alloys, or BeCu. IMM is fashioned at an initial phase of fabrication and kept throughout the following processes, including surface activation and final assembly. After assembly, the IMM is removed which electrically frees at last the adjacent dynodes from each other's. IMM has two major advantages. The first advantage is allowing the machining of adjacent dynodes with a high inter-location precision, thanks to the structural property of the IMM. The second advantage is eliminating invasive jigs to EDM machine the dynode shapes thanks to the electrical property of IMM, the jigs which might otherwise reduce yield and/or increase machining costs.

Post-Activation Bonding Assembly (PABA) may be applied between an insulator and the dynode array metal block after surface activation and before IMM removal. PABA advantageously allows for further assembly simplification while maintaining dynode-to-dynode high setting precision and the overall structural integrity. Due to the low temperature PABA process, in contrary to high temperature pre-activation brazing, PABA is a much lower cost option. The above-mentioned merits of PABA facilitates highly reliable DDEM assembly with improved performance and lower cost.

A high energy dynode is a metallic part shaped to attract charged particles and direct emitted charged secondaries particles toward an electron multiplier, enhancing high-mass charged particle detection efficiency.

Clearly of the approaches for fabrication of DDEM described herein allow for highly flexible DDEM designs, suitable to manufacture the device. The approaches described herein allow for free style designs, dictated by the specific requirements of numerous applications and at the same time design for manufacturing (DFM) can be accommodated in the design intent.

DESCRIPTION OF THE EMBODIMENTS

In at least one implementation, a fabrication of a discrete dynode electron multiplier (DDEM) starts with bonding a metal block of aluminum (Al), Al alloys or beryllium copper (BeCu) to a single ceramic, direct bonded copper (DBC) or direct bonded aluminum (DBA) plate with a cut out or opening. This cut out or opening provides an access for dynode machining for formation of geometrical ion optics on the metal block. Electric Discharge Machine (EDM) is suitable for creating the cut out due to its high precision and due to its lack of stress on the metal during the cutting process. In this machining stage, the dynode ion optics parts, the input end, the anode, the intended dynode region for native grown SEE, the electrical isolation inter-spacing between dynodes, and the critical spacing between upper and lower dynode arrays are established. (The terms "upper" and "lower" are used herein and in the claims only for convenience, to refer to the relative positions of elements within a given illustration, based on the orientation of a given drawing sheet. Such is not intended and should not be interpreted as requiring one element to be positioned relatively above or below another element.) The metal block of Al, Al alloys, or BeCu may be pre-machined to accommodate certain features to simplify the EDM cutting and the bonding process. Various bonding process may be suitable, for example brazing, spot welding (laser or resistive type), or soldering.

Figure 1A:
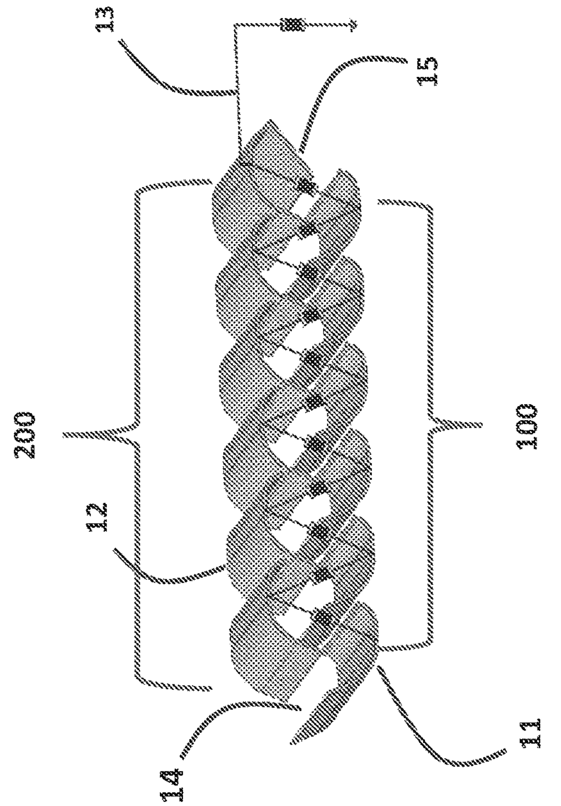
FIG. 1A is an isometric view of a conventional discrete dynode electron multiplier (DDEM).
Figure 1B:
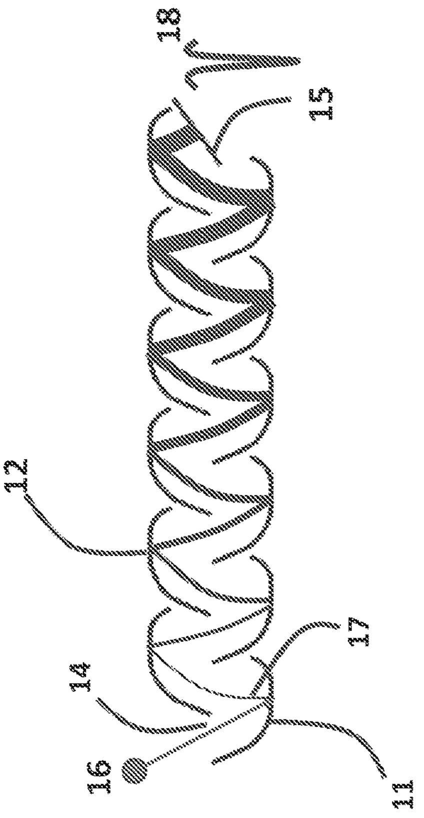
FIG. 1B is a representative cross-sectional view of the conventional DDEM of FIG. 1A.
Figure 2B:
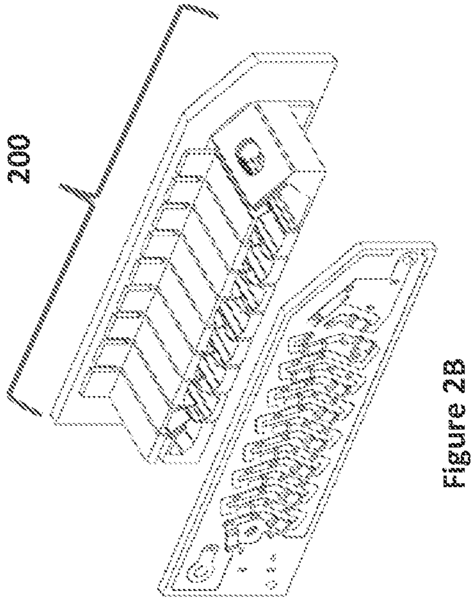
FIG. 2B is an isometric exploded view of the DDEM of FIG. 2A, better illustrating two components, a side wall and a wholly integrated dynode array made of aluminum, its alloys or BeCu block, bonded to a ceramic, DBC, or DBA frame and machined to form individual dynode.
Figure 2C:
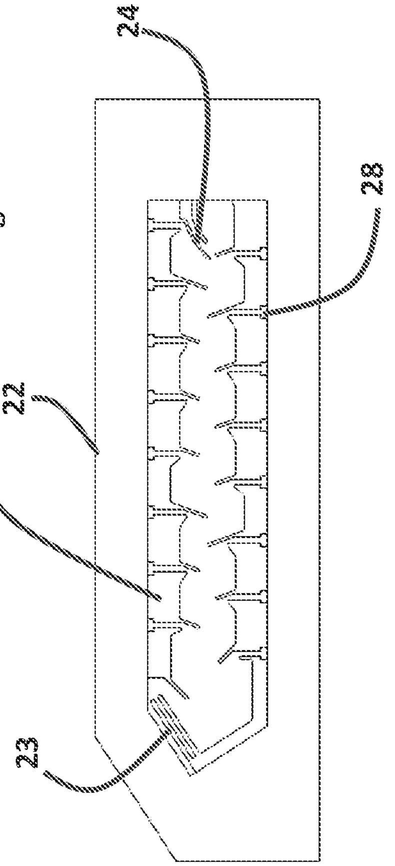
FIG. 2C is a cross-sectional view of the DDEM of FIG. 2A, built on ceramic, DBC, or DBA frame with a cut out.
Figure 2A:
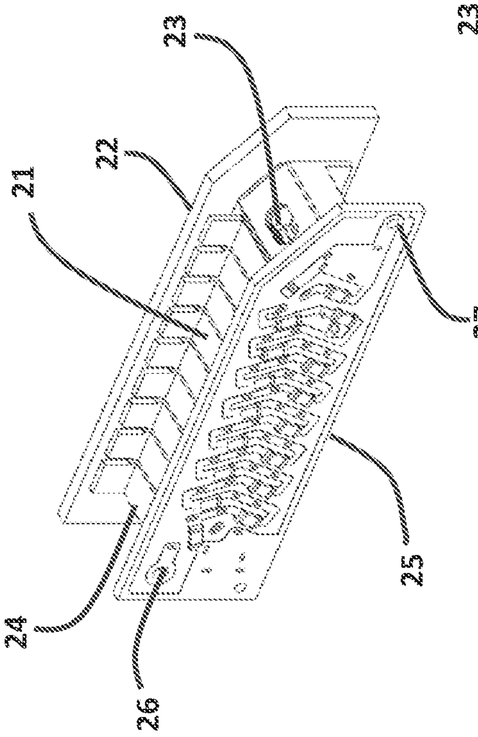
FIG. 2A is an isometric view of a dynode array in one unit packaging of a DDEM according to at least a first implementation of the invention.

FIGS. 2A-2C show a DDEM 200, according to at least a first illustrated implementation. In the DDEM 200 all individual dynodes 21 (only one called out), input end 23, and anode 24 are unified by a frame 22. The frame 22 advantageously employs a single substrate, for example ceramic substrate or plate, direct bonded copper (DBC) substrate or plate, or direct bonded aluminum (DBA) substrate or plate. Various components are advantageously integrated into a single unit dynode component 200*a* that includes upper and lower dynode arrays 200*b*, 200*c*, best illustrated in FIG. 2B. This construction advantageously, employs only two parts (i.e., the single unit or dynode component 200 and side wall 25 to build the DDEM 200. Side wall 25 provides an anode connection 26 and a high voltage connection or node 27 for electrical biasing.

A fabrication of the DDEM 200 starts with a block of a metal on which a native oxide can be grown (e.g., Al, Al alloys or BeCu). The metal block, which may be a single metal block, is physically coupled or attached to a single ceramic, DBC, or DBA substrate or plate that serves as the frame 22. The metal block is physically coupled or attached to a single ceramic, DBC, or DBA substrate or plate via any variety of techniques or structures, including but not limited to soldering, bonding, adhering (e.g., high temperature adhesive), clamping, riveting, fastening, etc. The two dynode arrays 200*b*, 200*c* are then machined from the metal block, preferably from a single metal block. This inherently self-aligns, self-positions, self-orients, self-spaces, and otherwise fixes the alignment, position, orientation and spacing between the dynodes 21 of each dynode array 200*b*, 200*c* fixed relative to one another. The machining may take a variety of forms, although EDM may be preferred. The resulting structure is then exposed to oxygen or an oxygen containing environment and heated to grow a native oxide on the exposed surfaces of the dynodes 21 of both dynode arrays 200*b*, 200*c*. Finally, the side wall may be mounted to the resultant single unit dynode component 200*a*.

The construction of the single unit dynode component 200*a* is highly advantageous in manufacturing, for example, with the alignment, position, orientation and spacing between the dynodes 21 of each dynode array 200*b*, 200*c* fixed relative to one another by being manufactured from a single block of material, eliminating the later need for alignment. The EDM the dynodes 21 of both dynode arrays 200*b*, 200*c* from a single block of material ensures that all dimensions are precise, including spacing between the upper and lower arrays. Such is made possible by the technique of growing a native oxide grown on the structure, whereas metallization of the opposed faces of the dynodes 21 of the opposed dynode arrays 200*b*, 200*c* is impractical. In this respect, metallization typically employs a beam which should face (e.g., perpendicular to) the surface being metallized. This is impractical or even impossible given the tight spacing between the opposed dynode arrays 200*b*, 200*c* when machined from a single piece of material or when two opposed dynodes, one from each dynode array 200*b*, 200*c*, are machined from a single piece of material. This may also advantageously avoid any need to form slots in the insulative substrate (e.g., single ceramic, DBC, or DBA substrate or plate).

FIG. 2C shows the single unit dynode component 200, where individual dynodes 21, input end 23, and anode 24 are held together by the frame 22 with inter-spacing between the dynodes 21 of the upper array and respective ones of the dynodes 28 of the lower array inherently fixed by the machining process rather than via a subsequent assembly operation. Note that geometrical shapes are exemplary, and other shapes may be employed. The construction of the DDEM 200 illustrated in FIGS. 2A-2C offers flexibility in cutting of dynode shapes. Consequently, a wide range of dynode designs can be easily achieved, for example an electron cloud splitter. The shape of the dynodes in an array or between arrays can vary from dynode to dynode based on one or more desired operational characteristics.

The dynodes 21, 28 of the integrated single unit dynode component 200*a* can be can be oxidized to generate a native oxide SEE. For example, the integrated single unit dynode component 200 can be subjected to a heating in air process to generate the native oxide SEE (e.g., Al2O3 from base metal Al). After oxidation, the integrated single unit dynode component 200*a* can be assembled together with a side wall 25 to form the DDEM 200. The elimination of a coating or process operation (e.g., deposition) allows reduction of a spacing between the upper array and lower array, advantageously facilitating miniaturization of the DDEM 200. This approach which employs generation of a native oxide SEE advantageously avoids a costly and complicated SEE coating process operation.

Figure 3B:
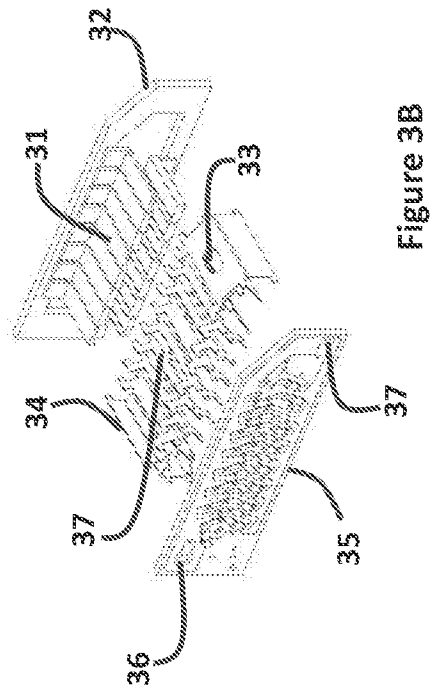
FIG. 3B is an exploded view of the DDEM of FIG. 3A, better illustrating various components, including a side wall, an ion optic structure, and integrated emissive dynodes united with a ceramic, DBC, or DBA frame prior to the shaping.

FIGS. 3A-3D show a DDEM 300, according to at least one illustrated implementation. A fabrication of the DDEM 300 starts with a metal block of Al, Al alloys or BeCu, which is bonded to a single ceramic, DBC, or DBA plate that serves as a frame 32. The DDEM 300 may be similar in some respects to the DDEM 300 described with respect to FIGS. 2A-2C, except that the ion optic structure, including input end and anode, is separated from the dynode SEE region. This illustration shows the design flexibility based on the invention. As best illustrated in FIG. 3B, the dynode SEE part 31 is integrated to the frame 32 and advantageously becomes a cartridge 300*a* for consumable replacement as the dynode surface ages due to usage. The dynode SEE part 31 is oxidized to generate native SEE oxide (e.g., Al2O3 from the Al) dynode raw material. In at least some implementations, the ion optic structure 37 is anchored to the side wall 35 carrying or bearing an electrical network 30. For example, the ion optic structure 37 along with input end 33 and anode 34 is held by the side wall 35 with a resistive network including anode 36 and high voltage connection or node 37. The ion optic structure 37 part will typically not need replacement due to expected usage, unless damaged. If desired, input end 33 and anode 34 structure could be unified into the cartridge.

Figure 3D:
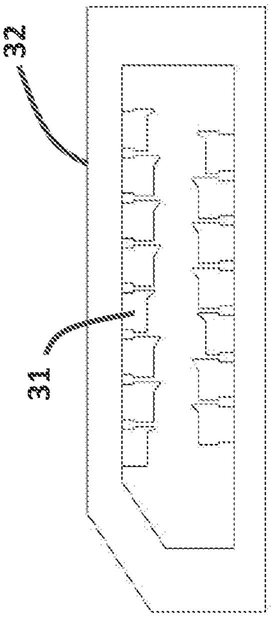
FIG. 3D is a second cross-sectional view of the DDEM of FIG. 3A, showing the integrated individual emissive dynode on a ceramic, DBC OR DBA frame.
Figure 3A:
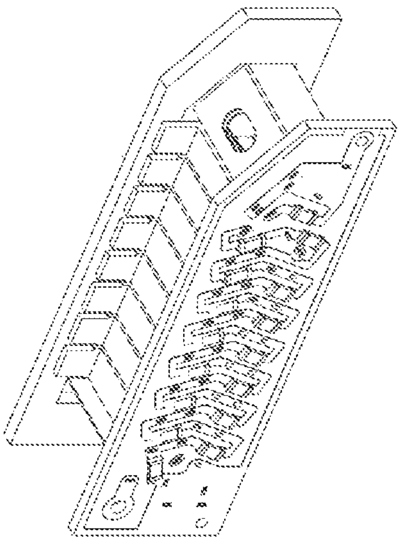
FIG. 3A is an isometric view of a DDEM according to at least a second implementation of the invention.
Figure 3C:
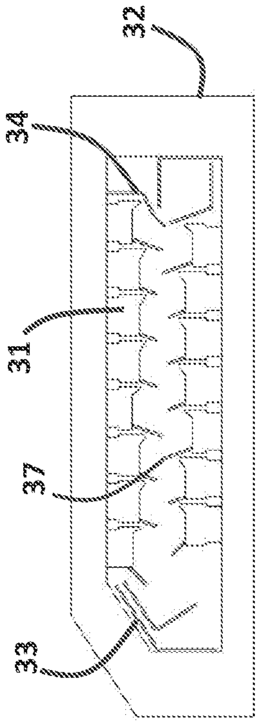
FIG. 3C is a first cross-sectional view of the DDEM of FIG. 3A, showing an ion optic structure separated from an integrated emissive dynode.

FIG. 3C shows upper and lower arrays of dynodes 21, 28, with native SEE oxide 31 held by a frame 32, ion optic structure 36, input end 33, and anode 34. The overall function is the same as of the wholly integrated dynode depicted in FIG. 2C. FIG. 3D shows a cartridge consisting of upper and lower arrays of dynodes 21, 28, with native SEE 31, and the frame 32. This part will be the replacement or consumable part for the DDEM 300.

Figure 4B:
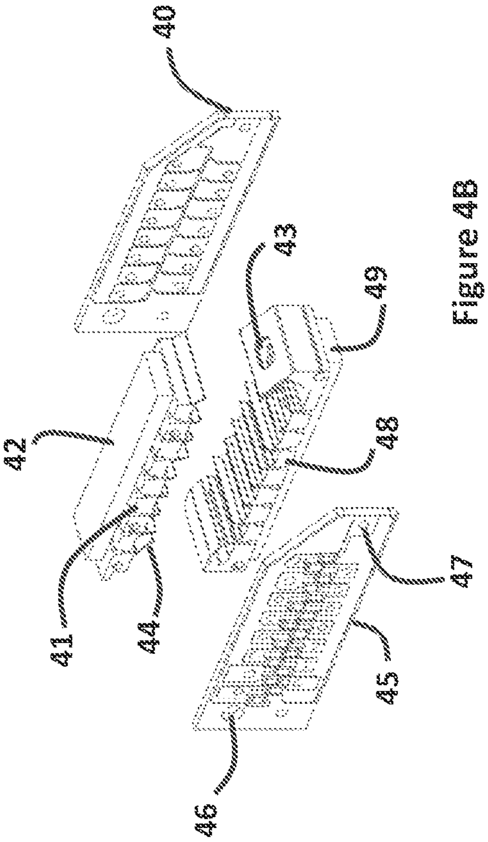
FIG. 4B is an exploded view of the DDEM of FIG. 4A, showing various components including a side wall carrying or containing an electrical network, an optional side wall for structural support, two dynode arrays held by a ceramic, DBC, or DBA plate, the two dynode arrays which constitute an upper and lower dynode array, respectively.
Figure 4C:
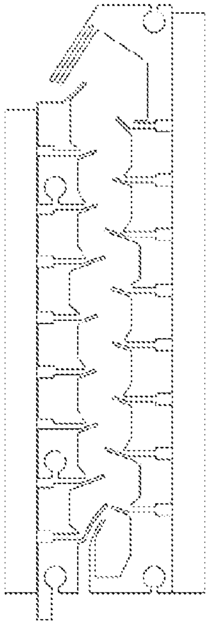
FIG. 4C is a cross-sectional view of the DDEM of FIG. 4A, better showing the upper and lower dynode arrays where the ion optic structure is integrated to the emissive dynode part.
Figure 4A:
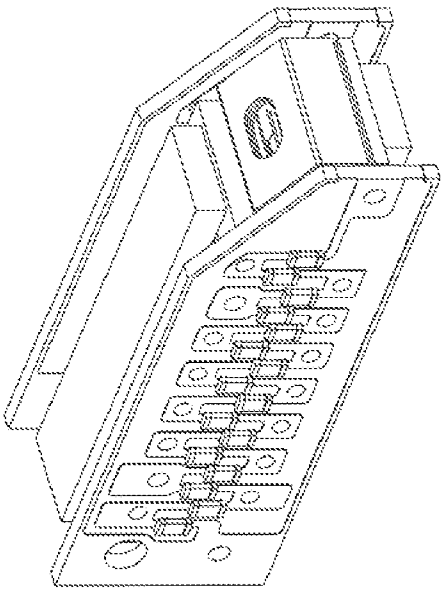
FIG. 4A is an isometric view of a DDEM according to at least a third implementation of the invention, built by bonding aluminum, aluminum alloys, or BeCu to two ceramic, DBC, or DBA plates.

FIGS. 4A-C show a DDEM 400, according to another illustrated implementation. A fabrication of the DDEM 400 starts with metal blocks of Al, Al alloys, or BeCu, which are then bonded, sandwiched between two plates (e.g., ceramic, DBC or DBA plates). This substrate configuration will generate a pair (upper and lower) of dynode arrays, including input end and anode part as commonly used in the DDEMs. A single dynode array can be created by the metal block and a ceramic based plate substrate configuration, if preferred. Electric Discharge Machine (EDM) operations (e.g., cutting) are the recommended dynode shaping cutting technique for the reasons mentioned above. The metal block of Al, Al alloys, or BeCu may be pre-machined to accommodate some features, for example to simplify the EDM cutting operations and the bonding process. At least one side wall carrying; or bearing an electrical network is advantageously used to integrate the upper and lower dynode arrays. The spacing between the two dynode arrays (e.g., upper and lower dynode arrays) is fixed though this side wall. The side wall is typically comprised of a ceramic plate. A second side wall may be employed to, for example, provide a more stable mechanical support.

As best illustrated in FIG. 4B a first plate 42 (e.g., ceramic, DBC, or DBA plate) holds or carries anode 44 and individual dynodes 41 (constituting upper dynode array). Similarly a second plate 49 (e.g., ceramic, DBC, or DBA plate) holds or carries an input end 43 and individual dynodes 48 (constituting lower dynode array). This dynode structure is exemplary, and a virtually unlimited variety of other shapes or configurations can be. As with the previously described implementations, the structure of FIG. 4B may be subject to an oxidation processor to generate an SEE native grown oxide, for example by heating of the Al, Al alloys, or BeCu dynode material in the presence of oxygen.

Side wall 45 carries an electric network 30, anode connection 46, and a high voltage node or point of contact 47 and provides the structural integrity of the DDEM 400. A second side wall 40 may be included for additional mechanical stability. As best illustrated in FIG. 4C an inter-spacing between the dynodes of the upper and lower arrays of dynodes is establishing by the cut formed during machining (e.g., EDM) of the dynode shapes. The distance between the upper and lower arrays of dynodes is determined by the side walls 45, 40.

This form of DDEM 400 where two ceramic, DBC, or DBA plates are used to hold the upper and lower arrays of dynodes can be built by separating the dynode ion optic structure, including input end and anode, from the dynode SEE region. The dynode SEE region component held by the plate constitutes a cartridge, therefore two cartridges are employed to form the illustrated DDEM 400. As will be apparent from this disclosure, the ion optic structure is integrated into at least one side wall 45, 40, the side wall 45 carrying an electrical network 30. The second side wall 40 may help to stabilize the mechanical structure.

Figure 5B:
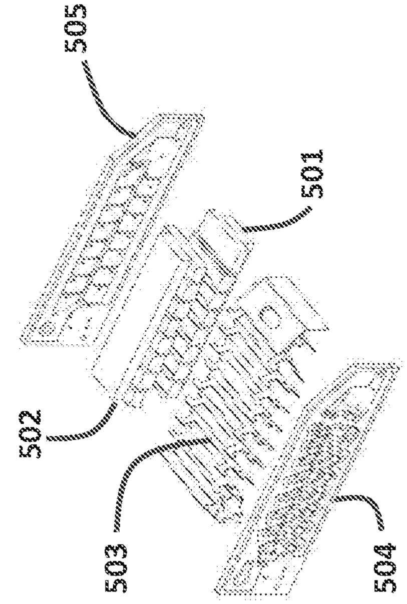
FIG. 5B is an exploded view of the DDEM of FIG. 5A, better illustrating various components, including two side walls, an ion optic structure, and two integrated emissive dynode arrays, each of the emissive dynode arrays held by a respective ceramic, DBC, or DBA plate.
Figure 5D:
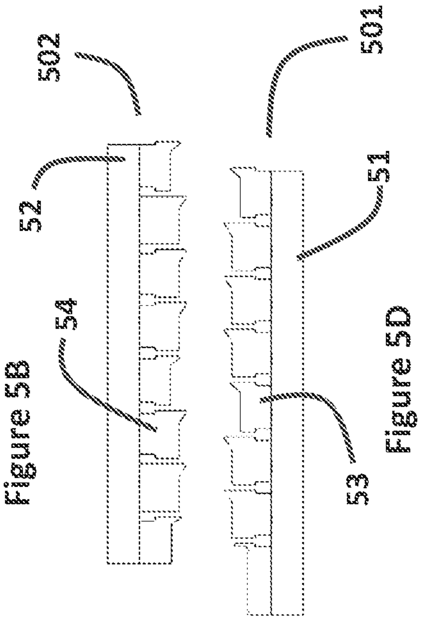
FIG. 5D is a second cross sectional view of the DDEM of FIG. 5A, better illustrating the upper and lower emissive dynode arrays.
Figure 5A:
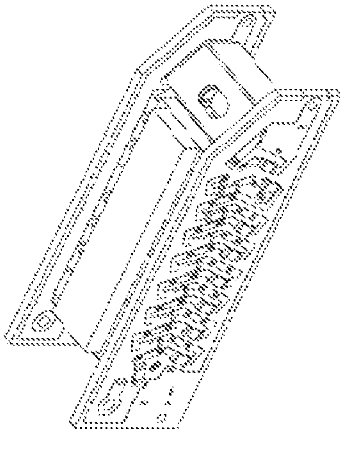
FIG. 5A is an isometric view of a DDEM according to at least a third implementation of the invention, constructed by separation an ion optic structure from an emissive dynode.
Figure 5C:
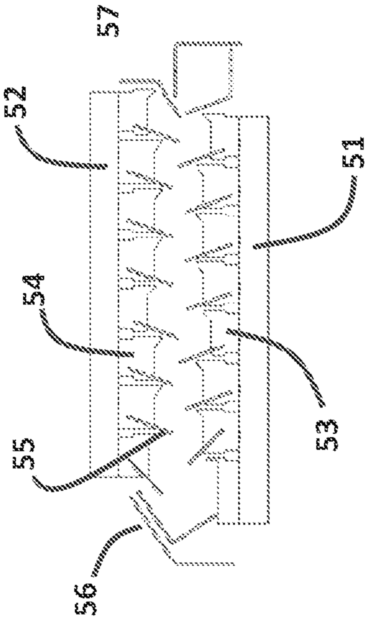
FIG. 5C is a first cross sectional view of the DDEM of FIG. 5A, better illustrating separated ion optic structure and two emissive dynode arrays (e.g., upper emissive dynode array, lower emissive dynode array).

FIGS. 5A-5D show a fully assembled DDEM 500, accord to at least one illustrated implementation. As best illustrated in FIG. 5B, the DDEM 500 comprises an upper cartridge 502 and a lower cartridge 501, an ion optic structure 503 including input end and anode end, and two side walls 504 and 505 that hold the ion optic structure 503. The oxidation process to grow SEE native oxide from the Al, Al alloys, or BeCu takes place after formation of the upper and the lower cartridges 502, 501. In practice, the ion optic structure can be bonded to a side wall 504 or the two side walls 504, 505. As best illustrated in FIG. 5C the ion optics structure 503 can be separated from the SEE grown oxide dynode regions 53, 54. Upper and lower cartridges 502, 501 comprise plates 51, 52 (e.g., ceramic, DBC or DBA plate) with individual SEE dynode regions 53, 54. Ion optic 55, input end 56, and anode 57 are held by the two side walls 504, 505. Alternatively, input end 56 and anode 57 could be integrated to one or both of the cartridges 501, 502. As best illustrated in FIG. 5D, the upper cartridge 502 and lower cartridge 501 can each serve as a spare or replacement part, to be replaced as the DDEM 500 ages. These cartridge arrangements will lower the cost of replacement for the end users.

Individual dynodes which include both an ion optic feature and SEE native grown oxide can be manually assembled to create an array of dynodes. This method still offers more advantages as compared to conventional approaches where each individual dynode is formed from metal sheet bending techniques. For example, machining offers virtually endless flexibility in dynode shaping as compare to metal bending, offers increased precision and higher tolerances in machining than metal bending, offers more flexible in designing the assembly process, etc.

Figure 6B:
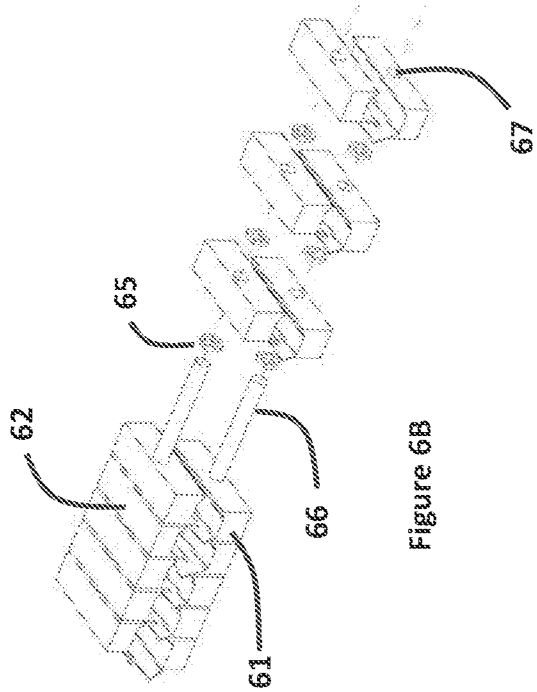
FIG. 6B is a partially exploded view of the assembly of dynode arrays of FIG. 6A, showing a "shish kebab" or "skewered" configuration, where two insulator rods are used and an electrical insulating spacer is used between successive dynodes for electrical biasing.
Figure 6C:
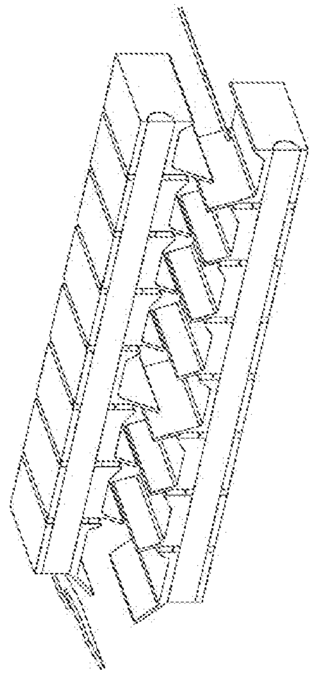
FIG. 6C is an isometric view of the assembly dynode arrays of FIG. 6B.
Figure 6A:
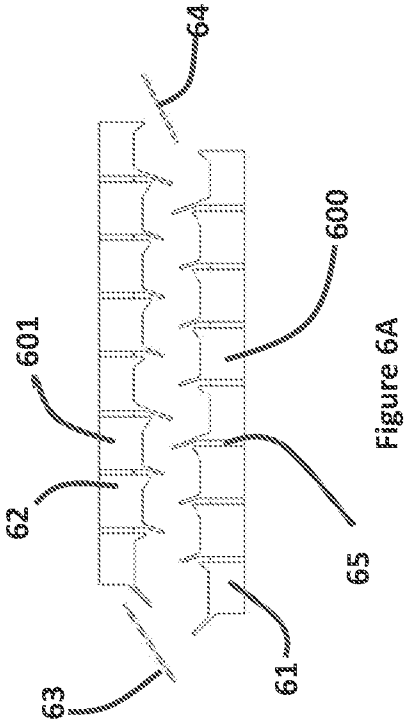
FIG. 6A is a side elevational view of an assembly of two dynode arrays, assembled from machined individual dynodes with ion optics integrated to the emissive part.

FIGS. 6A-6C show an upper array of dynodes 600 and lower array of dynodes 601 opposed from one another across a gap 603, according to at least one illustrated implementation. Each array of dynodes 600, 601 includes a respective plurality of machined individual dynodes 61, 62 made of Al, Al alloys, or BeCu. An inter-spacing is determined by the dimensions of an electrical insulator spacer 65 (two called out in FIG. 6B). It is understood that an electrical network (not shown in FIG. 6A) is employed in the assembly to form a DDEM device. Input end 63 and anode 64 can be integrated to side walls (not shown in FIG. 6A) or can be machined from a metallic block in a same or similar fashion as machining of the individual dynodes 600, 601.

As best illustrated in FIG. 6B, the components can be assembled in "shish kebab" or "skewered" fashion. One or more Insulating rods 66 (two called out in FIG. 6B) is used to hold the dynodes 62, 61 together as respective upper and lower dynode arrays 601, 600. The insulating rod 66 may, for example, pass or extend through a throughhole 67 (only one called out in FIG. 6B) formed through each of the of the individual dynodes 62, 61. An oxidation process operation to generate or grow a native oxide SEE is performed prior to assembling the components. The assembled dynode upper and lower arrays 601, 602 are illustrated in FIG. 6C.

Due to the flexibility in machining dynodes from Al, Al alloys, or BeCu material, where native oxide SEE can be grown from the base metal, this technology enables the formation of a cylindrically symmetry dynode or array of cylindrically symmetry dynodes. The benefits of the cylindrical dynode shape have been mentioned herein.

Figure 7B:
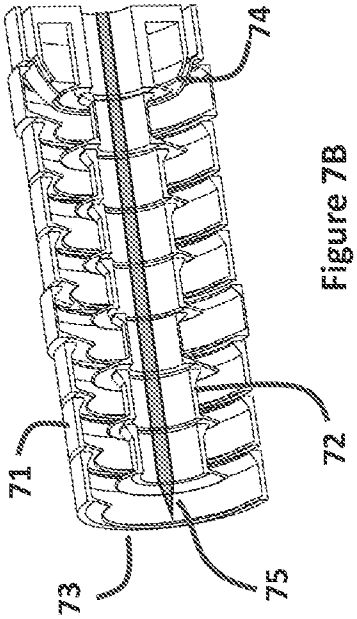
FIG. 7B is a cross sectional view of the cylindrical DDEM of FIG. 7A, showing an outer and an inner dynode machined from aluminum (Al), aluminum alloys, or beryllium copper (BeCu) blocks.
Figure 7D:
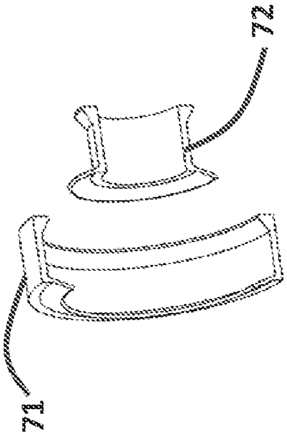
FIG. 7D is a cross sectional view of the outer and inner dynode of FIG. 7C.
Figure 7A:
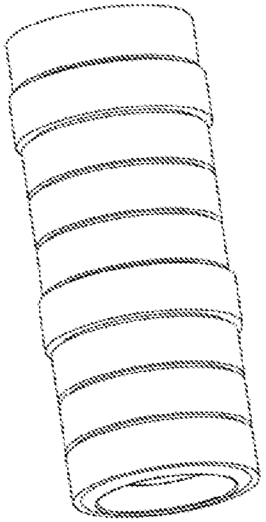
FIG. 7A is an isometric view of a cylindrical DDEM having a cylindrically symmetry DDEM for high performance particle detection, according to at least one illustrated implementation.

FIGS. 7A-7D show a cylindrical symmetry discrete dynode electron multiplier (DDEM) 700, according to at least one illustrated implementation. The cylindrical symmetry DDEM 700 includes an of outer dynode 71 and an inner dynode 72. It is understood other support structures may be employed to assemble these individual cylindrical symmetry dynodes 71, 72. Thus, the implementation illustrated in FIG. 7A is exemplary of a DDEM 700 with a cylindrical symmetry dynode shape, and other implementations may be employed.

Figure 7C:
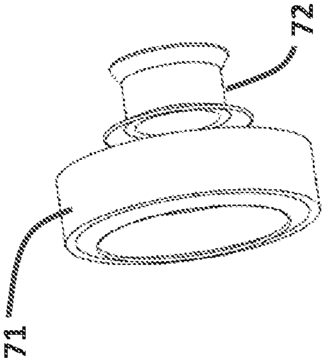
FIG. 7C is an isometric view of machined outer and inner dynodes for use as part of the cylindrical DDEM of FIG. 7A.

As best illustrated in FIG. 7B, the cylindrical symmetry DDEM 700 includes an outer dynode 71, inner dynode 72, input end 73, anode 74, and ion beam deflector 75. An oxidation process operation to grow a native oxide SEE (e.g., Al2O3 from Al) from the dynode raw material is performed prior to assembling. FIGS. 7C and 7D better illustrate the axial spatial relationship between the outer and the inner dynodes 71, 72 in the cylindrical symmetry dynode assembly 700. For example, the outer dynode 71 may be radially spaced with respect to a respective inner dynode 72, both for example aligned along a same longitudinal axis such that the outer and inner dynodes 71,72 are concentric with one another. Many cylindrical symmetry dynode shapes can be implemented according to desired operational characteristics. As in other implementations, the cylindrical symmetry dynodes can be formed by machining the dynodes from blocks of Al, Al alloys or BeCu, with subsequent formation of native oxides which possess good secondary electron emission (SEE) properties for the electron multiplication process.

Figure 8B:
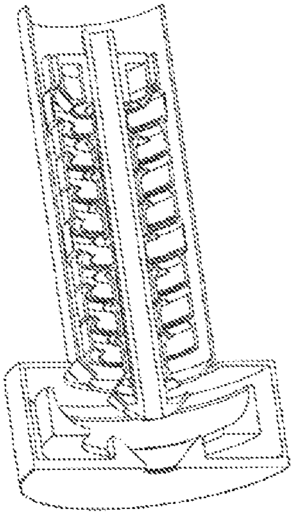
FIG. 8B is a cross sectional view of the cylindrical DDEM of FIG. 8A.
Figure 8A:
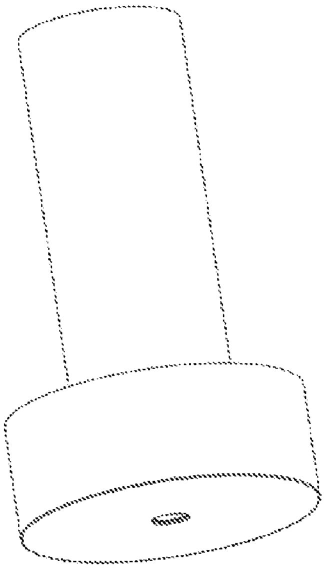
FIG. 8A is an isometric view of a cylindrical DDEM installed in a cylindrical envelope containing a cylindrical symmetry high energy dynode (HED), according to at least one illustrated embodiment.
Figure 8C:
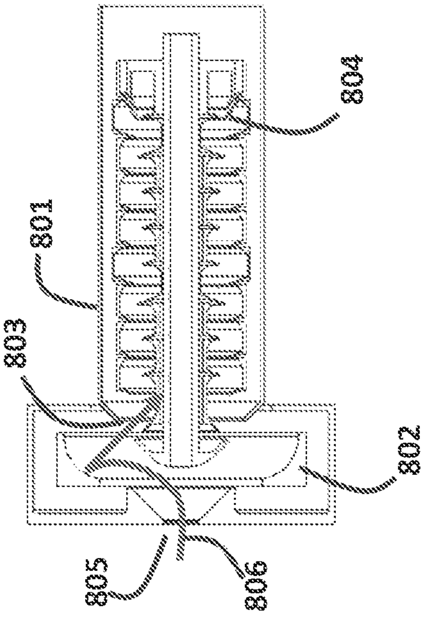
FIG. 8C is another cross sectional view of the cylindrical DDEM with the HED of FIG. 8A.

In some implementations, a high energy cylindrical dynode can simply be added before an input end of the cylindrical symmetry DDEM 700. For example, FIGS. 8A-8C show a device 800 that combines a high energy dynode (HED) 802 with a cylindrical symmetry DDEM 801 and a cylindrical envelope 807, according to at least one illustrated implementation. In operation, a charged particle enters the HED input 805, attracted to HED 802 generating secondary charged particles. The charged particles are detected via the HED 802 prior to the electron multiplication by the cylindrical symmetry DDEM 801. These charged particles are focused to an input end 803 of the cylindrical symmetry DDEM 801 inside the cylindrical envelope 807. The path of the charged particle along with secondary emission arriving at the cylindrical symmetry DDEM 801 is illustrated by line 806 (FIG. 8C). After electron multiplication process, the electron cloud is collected at the anode 804.

Figure 9C:
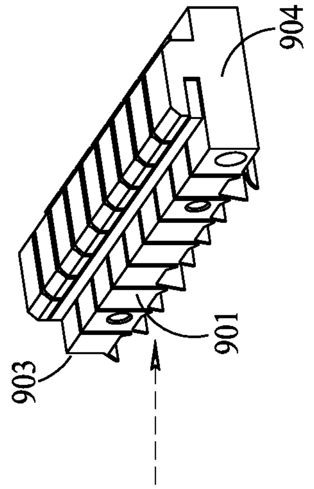
FIGS. 9A, 9B and 9C are cross sectional views illustrating manufacture of an individual dynode using inter metallic material (IMM) at three successive manufacturing operations, respectively, according to at least one illustrated implementation.
Figure 9B:
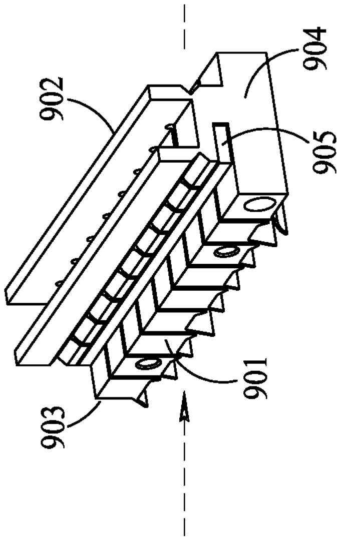
Figure 9A:
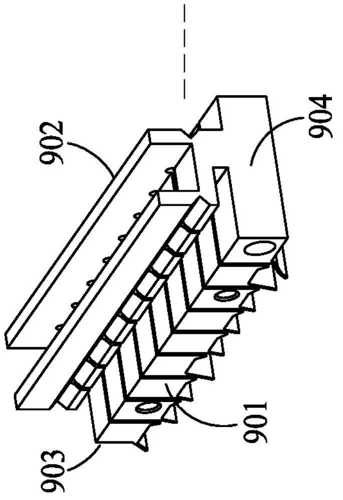

FIGS. 9A, 9B and 9C are cross sectional views illustrating manufacture of an individual dynodes 901 using inter metallic material (IMM) at three successive manufacturing operations, respectively, according to at least one illustrated implementation.

Individual dynodes 901, Inter-metallic material (IMM) 902, input end 903, and output end 904 are machined from a single unitary block of metal, for example aluminum, aluminum alloys, or BeCu. Each individual dynode 901 in the array of dynodes 901 is connected to one another by IMM 902. Such advantageously high precision in inter-dynode position, and also advantageously eases DDEM assembling process. The design shown in FIGS. 9A-9B serves as an example structure and method of fabrication or manufacture.

As best illustrated in FIG. 9B, after SEE emissive layer activation, an electrical insulator material 905 is installed in such a way to secure each individual dynodes 901 while IMM 902 is in place to maintain the high precision inter dynode position. The electrical insulator material 905 may take a variety of forms, for example a ceramic, glass or plastic. The securing can be accomplished by, for example, adhesive bonding (PABA).

As best illustrated in FIG. 9C, at final assembly of DDEM, or just after insertion of insulator 905, the IMM 902 can be removed. The electrical insulator 905 replaces the functionality previously served by the IMM 902. The IMM 902 constitutes a sacrificial material. This process electrically separates each individual dynode 901 from the other dynodes 901 in the array of DDEM.

This method of assembling is not limited to integrated native oxide devices (INODs), but it can be applied to other metals such as stainless steel where SEE layer can be added as required.

This application incorporates by reference the teachings of U.S. patent application Ser. No. 62/716,185, filed Aug. 8, 2018, in its entirety.

From all of the exemplary disclosed DDEM fabrication implementations described herein, it is evident that this fundamental technology offers advantages for flexibility in dynode shaping with high precision fit for implementing various designs driven by specific end use applications and by manufacturability considerations.

The invention claimed is:

1. A method of forming a device, the method comprising:

positioning a workpiece to be machined, the workpiece comprising a block of a base metal and a single substrate to which the block of the base metal is attached, the base metal selected from the group consisting of aluminum, aluminum alloy, and beryllium copper;

machining the block of the base metal to form a first dynode array and a second dynode array opposed to and spaced from the first dynode array; and growing a native oxide at a surface of least a portion of each of the dynodes of the first and the second dynode arrays, the native oxide comprising a secondary electron emissive layer.

2. The method of claim 1, further comprising:

attaching the block of the base metal to the single substrate via at least one of soldering, bonding, adhering, clamping, riveting, or fastening.

3. The method of claim 1 wherein attaching the block of the base metal to the single substrate comprises attaching the block of the base metal to at least one of a ceramic substrate, a direct bonded copper (DBC) substrate, or direct bonded aluminum (DBA) substrate.

4. The method of claim 1 wherein growing a native oxide at a surface of least a portion of the at least one dynode includes heating the machined piece of metal in a presence of oxygen.

5. The method of any of claim 1, further comprising:

detachably physically coupling a printed circuit board as a side wall carrying at least one electrical network to the first and the second dynode arrays to form a discrete dynode electron multiplier (DDEM).

6. The method of claim 1 wherein growing a native oxide at a surface of least a portion of the each of the first and the second one dynode arrays includes growing the native oxide with an inherent dopant in the native oxide.

7. The method of claim 1, further comprising:
actively doping the native oxide.

8. The method of claim 1 wherein growing a native oxide at a surface of least a portion of the at least one dynode includes growing one of an Al2O3 or a BeO layer directly from the base metal.

9. A method of forming a device, the method comprising:
providing a single unitary piece of a base metal selected from the group consisting of aluminum, aluminum alloy, and beryllium copper;
machining the piece of the base metal to form at least one dynode array having a first end and a second end, the second end opposed from the first end across a length of the dynode array, the dynode array comprising a plurality of dynodes arrayed along the length of the dynode array, each of the dynodes physically coupled to a successive one of the dynodes in the array via a metallic interconnect that fixes a position of each of the dynodes with respect to the successive one of the dynodes in the array; and
securing an insulator to the dynodes of the dynode array;
removing the metallic interconnect after securing an insulator to the dynodes of the dynode array.

10. The method of claim 9 wherein machining the piece of the base metal includes machining the piece of the base metal to form the metallic interconnect.

11. The method of claim 9 wherein machining the piece of the base metal includes machining the piece of the base metal to form a pair of the metallic interconnects, the metallic interconnects each extending along the length of the dynode array.

12. The method of claim 9, further comprising:
growing a native oxide at a surface of least a portion of the dynodes, the native oxide comprising a secondary electron emissive layer.

13. The method of claim 12 wherein growing a native oxide at a surface of least a portion of the at least one dynode includes heating the machined piece of metal in a presence of oxygen.

14. The method of claim 12 wherein growing a native oxide at a surface of least a portion of the at least one dynode includes growing the native oxide without depositing any oxide on the surface of the at least one dynode.

15. The method of claim 12 wherein growing a native oxide at a surface of least a portion of the at least one dynode includes growing one of an Al2O3 or a BeO layer directly from the base metal.

* * * * *